US011328308B1

(12) United States Patent
Cooper et al.

(10) Patent No.: US 11,328,308 B1
(45) Date of Patent: May 10, 2022

(54) SYSTEMS AND METHODS FOR MATCHING AND DELIVERING ACCOUNT-LEVEL DATA FROM MULTIPLE CUSTOMER-FACING PLATFORMS BASED ON CONTACT-LEVEL TOUCHPOINTS

(71) Applicant: Juniper Networks, Inc., Sunnyvale, CA (US)

(72) Inventors: Brian M. Cooper, Fremont, CA (US); Thomas P. McCarthy, Somerville, CA (US); Shalini Ruppa Subramanian, San Ramon, CA (US); Krishnakumar Angia Ramamoorthy, San Jose, CA (US); Michael E. Marcellin, Los Gatos, CA (US); Min Guo, Sunnyvale, CA (US); Nancy G. Weintraub, Los Altos, CA (US); Spandan Shivannaiah, Mysore (IN); Srinivas Attili, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 706 days.

(21) Appl. No.: 15/610,523

(22) Filed: May 31, 2017

(51) Int. Cl.
*G06Q 30/02* (2012.01)
*G06Q 30/06* (2012.01)

(52) U.S. Cl.
CPC ..... *G06Q 30/0201* (2013.01); *G06Q 30/0601* (2013.01)

(58) Field of Classification Search
CPC .............. G06Q 30/0201; G06Q 30/0601
See application file for complete search history.

(56) References Cited

U.S. PATENT DOCUMENTS 9,049,117 B1 * 6/2015 Nucci ............... H04L 63/302
2008/0270938 A1 * 10/2008 Carlson ............. G06Q 10/10
715/810

(Continued)

FOREIGN PATENT DOCUMENTS

WO WO-2011031973 A1 * 3/2011 ............. G06Q 30/02

OTHER PUBLICATIONS

Blakemore et al, Fingerprinting for Web Applications: From Devices to Related Groups (Year: 2016).*

(Continued)

*Primary Examiner* — Mohamed N El-Bathy
(74) *Attorney, Agent, or Firm* — FisherBroyles, LLP (57) ABSTRACT

The disclosed method may include (1) deploying a virtual-tracking technology across a plurality of customer-facing platforms, (2) detecting, via one customer-facing platform, a first touchpoint between a browser of a contact related to a buyer-side business and a seller-side business, (3) generating, by way of the virtual-tracking technology, a cookie that is linked to the buyer-side business, (4) dropping the cookie into the browser of the contact during the first touchpoint, (5) detecting, via another customer-facing platform, a second touchpoint between the browser of the contact and the seller-side business based at least in part on the cookie, and then (6) tracing a customer journey that (A) represents the interactions between the buyer-side business and the seller-side business via the contact and (B) accounts for the first touchpoint and the second touchpoint. Various other systems, methods, and computer-readable media are also disclosed.

19 Claims, 7 Drawing Sheets

(56) References Cited

U.S. PATENT DOCUMENTS

| | | | |
|---|---|---|---|
| 2009/0119161 A1* | 5/2009 | Woda | G06Q 10/00 |
| | | | 705/7.29 |
| 2010/0121684 A1* | 5/2010 | Morio | G06Q 10/06311 |
| | | | 705/7.13 |
| 2010/0191577 A1* | 7/2010 | Lu | G06Q 30/0203 |
| | | | 705/7.32 |
| 2012/0232955 A1* | 9/2012 | Riazzi | G06Q 30/0204 |
| | | | 705/7.32 |
| 2012/0324101 A1* | 12/2012 | Pecjack | H04L 67/02 |
| | | | 709/224 |
| 2013/0046760 A1* | 2/2013 | Evans | G06Q 10/10 |
| | | | 707/728 |
| 2013/0054501 A1* | 2/2013 | Lassesen | G06Q 30/02 |
| | | | 706/45 |
| 2015/0106198 A1* | 4/2015 | Miller | G06Q 30/0251 |
| | | | 705/14.52 |
| 2017/0078415 A1* | 3/2017 | Wang | G06Q 30/02 |
| 2017/0243246 A1* | 8/2017 | Rodriguez | G06Q 30/0255 |

OTHER PUBLICATIONS

Wikipedia—BlueKai, https://en.wikipedia.org/wiki/BlueKai, Mar. 31, 2016.

Marketing Orchestration Platform, http://www.engagio.com/marketing-orchestration-platform/, as accessed Jun. 1, 2017.

* cited by examiner

Marketing Insight Report
600

Marketing Insights
February 2017 ACME CORP

Engagement Overview

Current Month Engagement Score & Trend 99 83 72 50 42 45 51 71 71 57 78
93            48
3/16 4/16 5/16 6/16 7/16 8/16 9/16 10/16 11/16 12/16 1/17 2/17

Account Level Engagement Summary

| Pre-Sale Content on Juniper.net | | | | All Other Pages on Juniper.net | | |
|---|---|---|---|---|---|---|
| SUBJECT | # of Users | Page Views | Time Spent | SUBJECT | # of Users | Page Views |
| Swithcing | 3 | 5 | 0.8 | Training | 6 | 58 |
| Security | 1 | 3 | 2.6 | TechDocs | 10 | 44 |
| Routing | 1 | 2 | 1.7 | Forums | 2 | 4 |
| Policy | 1 | 1 | 20.2 | Support | 2 | 1 |
| Network | | | | Company | 2 | 1 |
| Operations | | | | Homepage | | |
| SDN | | | | MyJuniper | | |
| Solutions | | | | Partner | | |
| Optics | | | | Other | | |
| TOTAL | 6 | 11 | 25.1 | TOTAL | 11 | 108 |

Contact Details – Event, Juniper.net, and Email

| Name | Email Address | Event Name | Event Status | Event Date |
|---|---|---|---|---|
| Jane Doe | jane.doe@juniper.net | Automation Concepts for Financial Services Customers | Attended | 2017-02-08 |
| John Doe | john.doe@juniper.net | Datacard Integration | Attended | 2017-02-10 |

SYSTEMS AND METHODS FOR MATCHING AND DELIVERING ACCOUNT-LEVEL DATA FROM MULTIPLE CUSTOMER-FACING PLATFORMS BASED ON CONTACT-LEVEL TOUCHPOINTS

BACKGROUND

Business-to-business (B2B) sales are often driven by information provided to the seller about the buyer's activities and/or interests with respect to the seller's products and/or services. Unfortunately for B2B salespeople, procuring reliable information about the buyer's activities and/or interests is not always easy.

As an example, analysts at a seller-side business may be tasked with gathering and/or delivering information about which buyer-side businesses are visiting the seller's website or events, how frequently they visit, and what they are doing during their visits. However, since buyers often visit the seller's website or events somewhat anonymously and/or without leaving much of a digital footprint, these analysts may be unable to provide a full picture and/or representation of all the buyers' activities and/or interests involving the seller's products and/or services. As a result, the B2B salespeople at the seller-side business may be unaware of the breadth, degree, and/or focus of the buyer-side businesses' purchasing journey—all of which could benefit the B2B salespeople in closing their deals.

SUMMARY

As will be described in greater detail below, the instant disclosure generally relates to systems and methods for matching and delivering account-level data from multiple customer-facing platforms based on contact-level touchpoints. In one example a method for accomplishing such a task may include (1) deploying a virtual-tracking technology across a plurality of customer-facing platforms that monitor interactions between a buyer-side business and a seller-side business, (2) detecting, via one of the customer-facing platforms, a first touchpoint between a browser of a contact related to the buyer-side business and the seller-side business, (3) generating, by way of the virtual-tracking technology, a cookie that is linked to the buyer-side business (4) dropping, via the customer-facing platform, the cookie into the browser of the contact during the first touchpoint, (5) detecting, via another one of the customer-facing platforms, a second touchpoint between the browser of the contact and the seller-side business based at least in part on the cookie, and then (6) tracing, based at least in part on the cookie, a customer journey that (A) represents the interactions between the buyer-side business and the seller-side business via the contact and (B) accounts for the first touchpoint and the second touchpoint.

Similarly, a corresponding system may include various modules stored in memory and at least one physical processor configured to execute those modules. In particular, the system may include (1) a deployment module that deploys a virtual-tracking technology across a plurality of customer-facing platforms that monitor interactions between a buyer-side business and a seller-side business, (2) a detection module that detects, via one of the customer-facing platforms, a first touchpoint between a browser of a contact related to the buyer-side business and the seller-side business, (3) a cookie module that (A) generates, by way of the virtual-tracking technology, a cookie that is linked to the buyer-side business and (B) drops, via the customer-facing platform, the cookie into the browser of the contact during the first touchpoint, wherein the detection module detects, via another one of the customer-facing platforms, a second touchpoint between the browser of the contact and the seller-side business based at least in part on the cookie, and (5) a tracing module that traces, based at least in part on the cookie, a customer journey that (A) represents the interactions between the buyer-side business and the seller-side business via the contact and (B) accounts for the first touchpoint and the second touchpoint.

In some examples, the above-described method may be encoded as computer-readable instructions on a non-transitory computer-readable medium. For example, a computer-readable medium may include one or more computer-executable instructions that, when executed by at least one processor of a computing device, cause the computing device to (1) deploy a virtual-tracking technology across a plurality of customer-facing platforms that monitor interactions between a buyer-side business and a seller-side business, (2) detect, via one of the customer-facing platforms, a first touchpoint between a browser of a contact related to the buyer-side business and the seller-side business, (3) generate, by way of the virtual-tracking technology, a cookie that is linked to the buyer-side business, (4) drop, via the customer-facing platform, the cookie into the browser of the contact during the first touchpoint, (5) detect, via another one of the customer-facing platforms, a second touchpoint between the browser of the contact and the seller-side business based at least in part on the cookie, and then (6) trace, based at least in part on the cookie, a customer journey that (A) represents the interactions between the buyer-side business and the seller-side business via the contact and (B) accounts for the first touchpoint and the second touchpoint.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for matching and delivering account-level data from multiple customer-facing platforms based on contact-level touchpoints. The term "account," as used in this context, generally refers to a designation and/or record that corresponds to and/or represents a specific entity and/or organization. In one example, an account may correspond to and/or represent a buyer-side business. Additionally or alternatively, the account may correspond to and/or represent an existing customer or potential customer of a seller ide business.

The term "contact," as used in this context, generally refers to a person or group of people related in one way or another to an entity and/or organization represented by an account. In one example, a contact may correspond to and/or represent a member, representative, and/or employee of a buyer-side business. In this example, the buyer-side business may correspond to and/or be represented by an account. Accordingly, the contact may interact with a seller-side business on behalf of the buyer-side business such that the contact's activities implicate the buyer-side business in one way or another with respect to the seller-side business. For example, the contact's activities may indicate and/or provide insight into the buyer-side business's interest in purchasing a certain product or service from the seller-side business. Consequently, the contact's activities may essentially be attributed and/or ascribed to the buyer-side business.

The relationship between accounts and contacts may be described as one-to-many. For example, a single account may include and/or be related to multiple contacts. In one example, the account and each contact may have a parent-child relationship.

As will be explained in greater detail below, embodiments of the instant disclosure may deploy a virtual-tracking technology across various customer-facing platforms. This virtual-tracking technology may facilitate tracking the activities of buyer-side businesses by embedding, into the browsers of contacts, cookies that each include a virtual IDentifier (ID) that represent and/or are related in one way or another to those buyer-side businesses. Each virtual ID may correspond and/or be linked to the specific contact and/or buyer-side business. Accordingly, the presence of such a virtual ID r ay indicate that the browser is operated by the corresponding contact of the buyer-side business.

By embedding the cookies in this way, embodiments of the instant disclosure may be able to detect touchpoints initiated by contacts of buyer-side businesses. The term "touchpoint," as used herein, generally refers to any point of contact and/or interaction (whether physical or virtual) between a buyer-side business and a seller-side business. For example, every time a contact of a certain buyer-side business visits a seller-side business's website, embodiments of the instant disclosure may identify the contact's virtual ID in the cookie embedded in the contact's browser. These embodiments may then log such instances as touchpoints initiated by that contact. As a result, the contact's activities detected in connection with these touchpoints may eventually be attributed and/or ascribed to the buyer-side business.

Additionally or alternatively, every time a contact of that buyer-side business interacts with a customer-facing platform that is linked and/or related to that buyer-side business in one way or another, embodiments of the instant disclosure may identify the contact's virtual ID in the cookie embedded in the contact's browser. These embodiments may then log such instances as touchpoints initiated by that contact. As a result, the contact's activities detected in connection with these touchpoints may eventually be attributed and/or ascribed to the buyer-side business.

Accordingly, embodiments of the instant disclosure may aggregate, gather, and/or monitor touchpoints initiated by contacts of buyer-side businesses across various customer-facing platforms. By aggregating, gathering, and/or monitoring touchpoints in this way, these embodiments may be able to trace the customer journey of a buyer-side business throughout the investigation process and/or the purchasing process. As a result, these embodiments may be able to piece together the customer journey of that buyer-side business based on the activities of multiple contacts detected by multiple customer-facing platforms. This customer journey may provide valuable insight into how the seller-side business could potentially (1) capitalize on the buyer-side business's interests, (2) improve the buyer-side business's level of engagement, and/or (3) increase sales for the buyer-side business.

Figure 1:
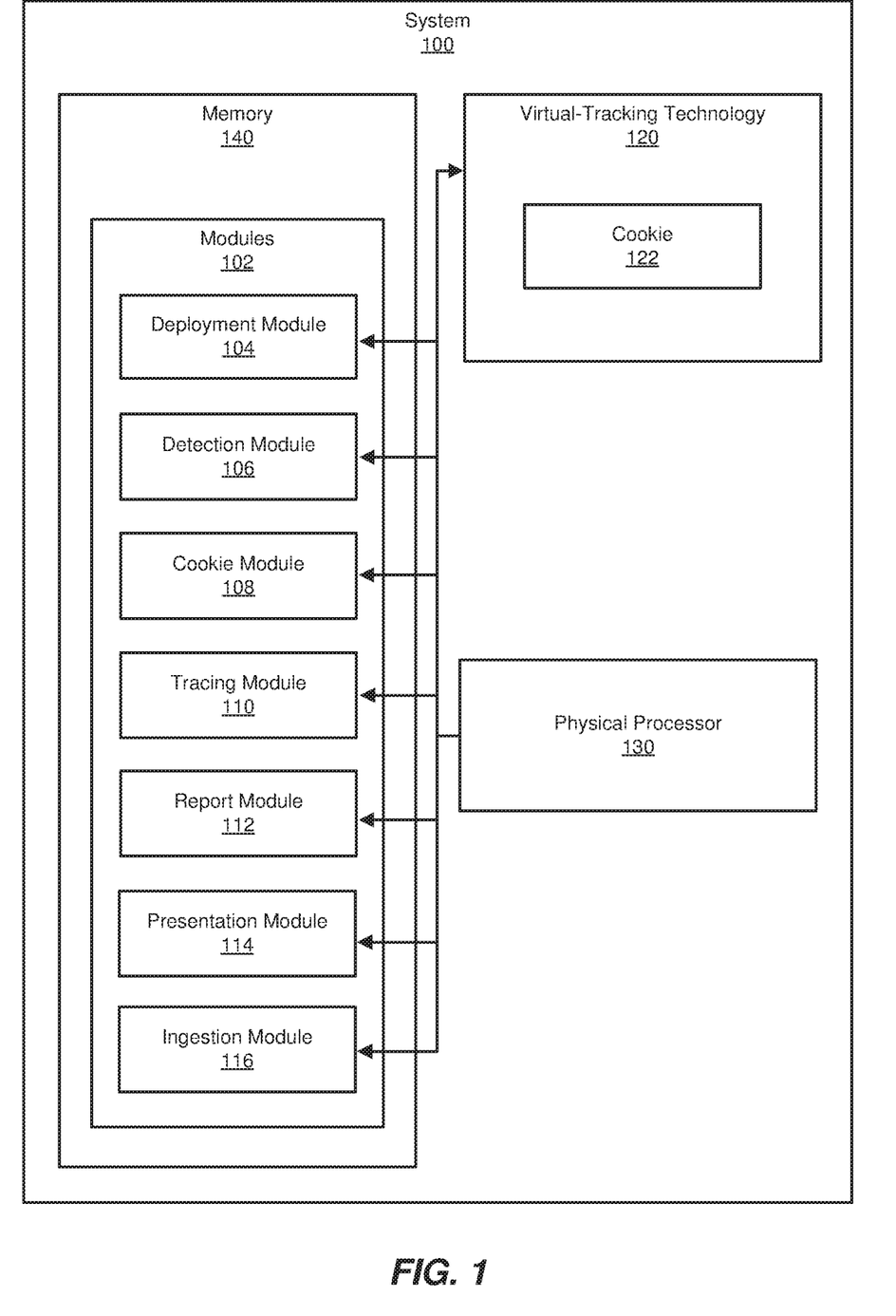
FIG. 1 is a block diagram of an exemplary system for matching and delivering account-level data from multiple customer-facing platforms based on contact-level touchpoints.
Figure 2:
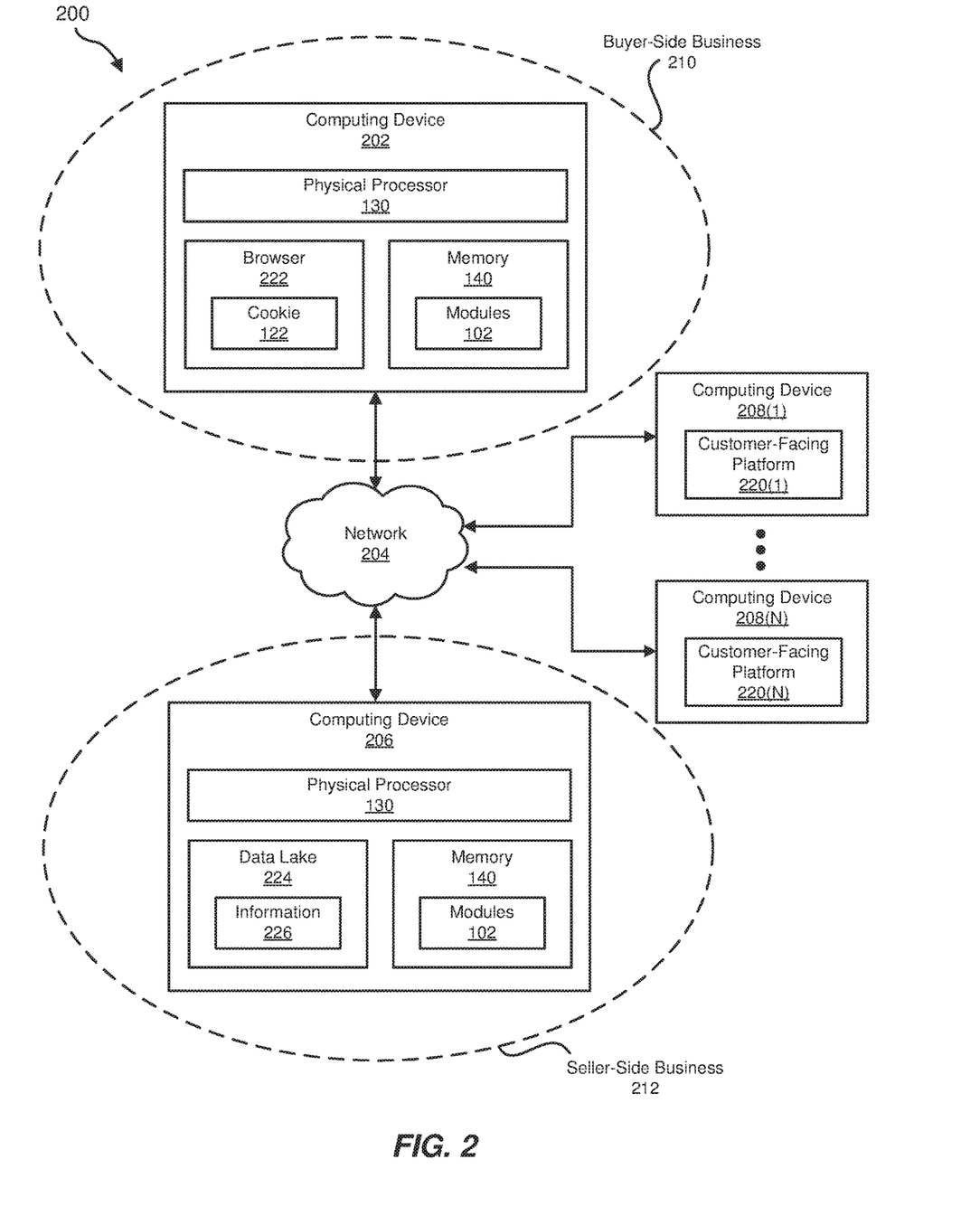
FIG. 2 is a block diagram of an exemplary system for matching and delivering account-level data from multiple customer-facing platforms based on contact-level touchpoints.
Figure 3:
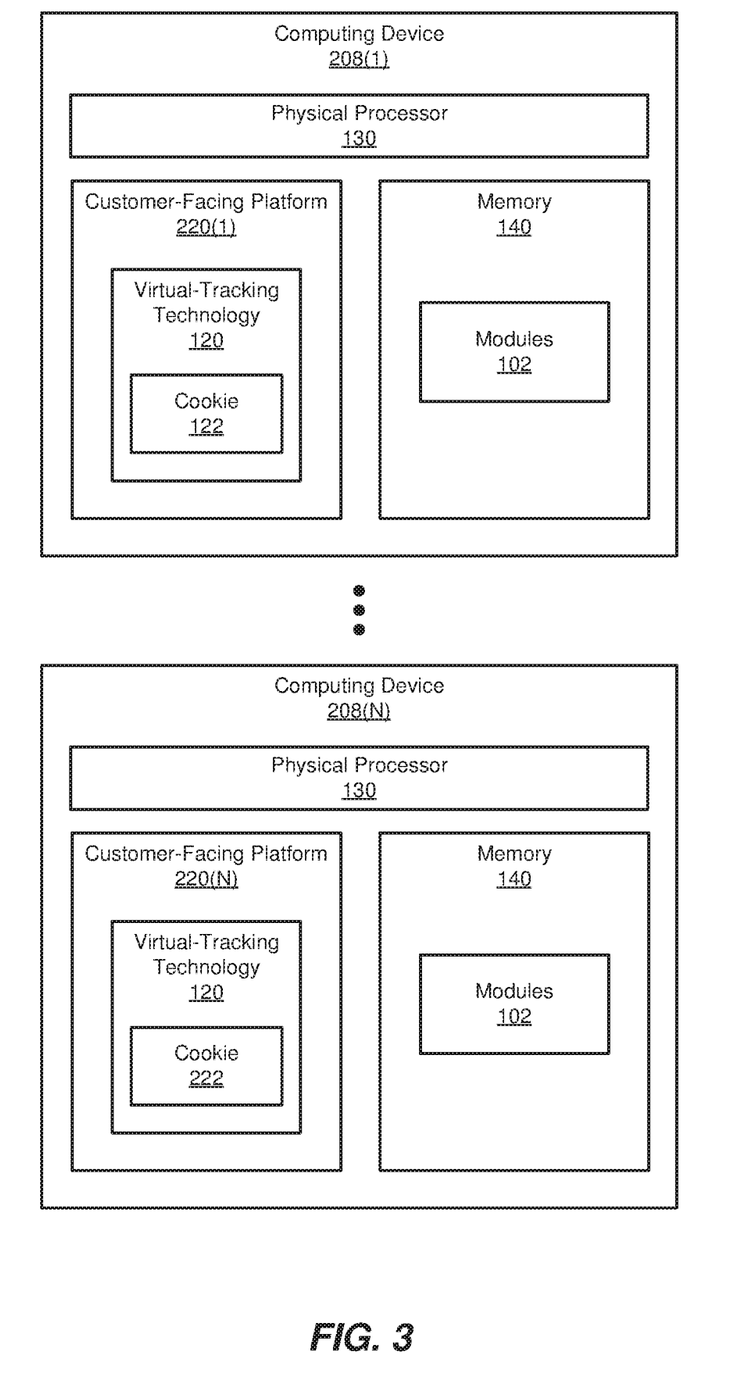
FIG. 3 is a block diagram of an exemplary system for matching and delivering account-level data from multiple customer-facing platforms based on contact-level touchpoints.

The following will provide, with reference to FIGS. 1, 2, and 3, detailed descriptions of exemplary systems and/or implementations for matching and delivering account-level data from multiple customer-facing platforms based on contact-level touchpoints. Detailed descriptions of corresponding computer-implemented methods will be provided in connection with FIG. 4. Detailed descriptions of an exemplary data ingestion process will be provided in connection with FIG. 5. Detailed descriptions of an exemplary marketing insight report will be provided in connection with FIG. 6. In addition, detailed descriptions of an exemplary computing system that facilitates matching and delivering such account-level data will be provided in connection with FIG. 7.

FIG. 1 is a block diagram of an exemplary system 100 for matching and delivering account-level data from multiple customer-facing platforms based on contact-level touchpoints. As illustrated in this figure, exemplary system 100 may include one or more modules 102 for performing one or more tasks. As will be explained in greater detail below, modules 102 may include a deployment module 104, a detection module 106, a cookie module 108, a tracing module 110, a report module 112, a presentation module 114, and an ingestion module 116. Although illustrated as separate elements, one or more of modules 102 in FIG. 1 may represent portions of a single module or application. Additionally or alternatively, system 100 may represent a distributed system in which modules 102 are distributed across multiple physical computing devices.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing devices 202, 206, and 208(1)-(N)), the devices illustrated in FIG. 3, and/or the computing system illustrated in FIG. 7. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate matching and delivering account-level data from multiple customer-facing platforms based on contact-level touchpoints. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, system 100 may further include a virtual-tracking technology 120. Virtual-tracking technology 120 generally represents any type or form of application, script, and/or module that monitors, tracks, and/or facilitates monitoring or tracking interactions between buyer-side businesses and seller-side businesses. In one example, virtual-tracking technology 120 may include and/or represent JAVASCRIPT code that is deployed into and/or across multiple customer-facing platforms. In this example, the JAVASCRIPT code may generate a cookie 122 linked to a buyer-side business and/or one of the contacts of that buyer-side business. In this example, the JAVASCRIPT code may drop cookie 122 into the browser of that contact during a touchpoint in which that contact uses one of the customer-facing platforms via his or her browser.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202, 206, and 208(1)-(N). System 200 may also include a network 204 that facilitates communication among computing devices 202, 206, and 208(1)-(N). In one example, all or a portion of the functionality of modules 102 may be performed by one or more of computing devices 202, 206, and 208(1)-(N). As will be described in greater detail below, one or more of modules 102 from FIG. 1 may, when executed by at least one processor of computing device 206, enable computing device 206 to match and deliver account-level data from multiple customer-facing platforms based on contact-level touchpoints.

As illustrated in FIG. 2, computing device 202 may correspond to and/or be associated with a buyer-side business 210. For example, a contact of buyer-side business 210 may operate computing device 202. Additionally or alternatively, computing device 202 may be owned by buyer-side business 210. In another example, computing device 202 may be physically located at a site owned by buyer-side business 210 and/or run on a network that belongs to buyer-side business 210. Computing device 202 may include, execute, and/or provide a browser 222 that facilitates accessing, searching, and/or using the Internet.

Similarly, computing device 206 may correspond to and/or be associated with a seller-side business 212. For example, an analyst or administrator of seller-side business 212 may operate computing device 206. Additionally or alternatively, computing device 206 may be owned by seller-side business 212. In another example, computing device 206 may be physically located at a site owned by seller-side business 212 and/or run on a network that belongs to seller-side business 212. Computing device 206 may include, maintain, store, and/or process a data lake 224. In one example, data lake 224 may include information 226 collected via multiple customer-facing platforms about the interactions between buyer-side-business 210 and seller-side business 212.

In some examples, one or more of computing devices 208(1)-(N) may correspond to and/or be associated with seller-side business 212. In other examples, one or more of computing devices 208(1)-(N) may correspond to and/or be associated with a third party that performs certain tasks and/or services for, on behalf of, and/or in connection with seller-side business 212. In any case, computing devices 208(1)-(N) may include, execute, host, and/or provide customer-facing platforms 220(1)-(N) that facilitate monitoring interactions between buyer-side business 210 and seller-side business 212 and/or collecting information about such interactions.

Computing devices 202, 206, and 208(1)-(N) each generally represent any type or form of computing device capable of reading computer-executable instructions. Examples of computing devices 202, 206, and 208(1)-(N) include, without limitation laptops, tablets, desktops, servers, network devices, routers, switches, hubs, modems, bridges, repeaters, gateways, multiplexers, network adapters, network interfaces, network racks, chasses, storage devices, client devices, cellular phones, Personal Digital Assistants (PDAs), multimedia players, embedded systems, wearable devices (e.g., smart watches, smart glasses, etc.), gaming consoles, portions of one or more of the same, combinations or variations of one or more of the same, and/or any other suitable computing devices.

Customer-facing platforms 220(1)-(N) each generally represent any type or form of interface, mechanism, and/or application that facilitates interaction and/or contact between a buyer-side business and a seller-side business. Examples of customer-facing platforms 220(1)-(N) include, without limitation, a web-based advertising platform (such as DOUBLECLICK, BING, and/or ADTECH), a website analytics platform (such as ADOBE and/or GOOGLE), an online form, a webpage, a website, a marketing automation platform (such as ELOQUA, MARKETO, and/or HUBSPOT), a Customer Relationship Management (CRM) platform (such as SALESFORCE and/or DYNAMICS 365), a financial management platform (such as SAP and/or ORACLE), a reverse Internet Protocol (IP) lookup tool (such as DEMANDBASE, KICKFIRE, and/or D&B), an intent-data aggregator (such as BOMBORA), an analyst-driven data aggregator (such as GARTNER, FORRESTER, and/or INTERNATIONAL DATA CORPORATION (IDC)), combinations or variations of one or more of the same, and/or any other suitable customer-facing platforms.

Network 204 generally represents any medium or architecture capable of facilitating communication or data transfer. Network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, portions of one or more of the same, variations or combinations of one or more of the same and/or any other suitable network. Although illustrated as being external to network 204 in FIG. 2, one or more of computing devices 202, 206 and 208(1)-(N) may represent a portion of network 204 and/or be included in network 204.

FIG. 3 is a block diagram of computing devices 208(1)-(N) that provide and/or host customer-facing platforms 220(1)-(N). As illustrated in this figure, computing devices 208(1)-(N) may each include an instance of physical processor 130 and/or an instance of memory 140. In one example, computing devices 208(1)-(N) may also include one or more of modules 102 stored in memory 140. As discussed above in connection with FIG. 2, computing devices 208(1)-(N) may include, execute, host, and/or provide customer-facing platforms 220(1)-(N). In this example, customer-facing platforms 220(1)-(N) may each incorporate virtual-tracking technology 120. In other words, virtual-tracking technology 120 may be deployed by and/or through customer-facing platforms 220(1)-(N).

As illustrated in this figure, exemplary system 100 may include one or more modules 102 for performing one or more tasks. As will be explained in greater detail below, modules 102 may include a deployment module 104, a detection module 106, a cookie module 108, a tracing module 110, a report module 112, a presentation module 114, and an ingestion module 116. Although illustrated as separate elements, one or more of modules 102 in FIG. 1 may represent portions of a single module or application. Additionally or alternatively, system 100 may represent a distributed system in which modules 102 are distributed across multiple physical computing devices.

Figure 4:
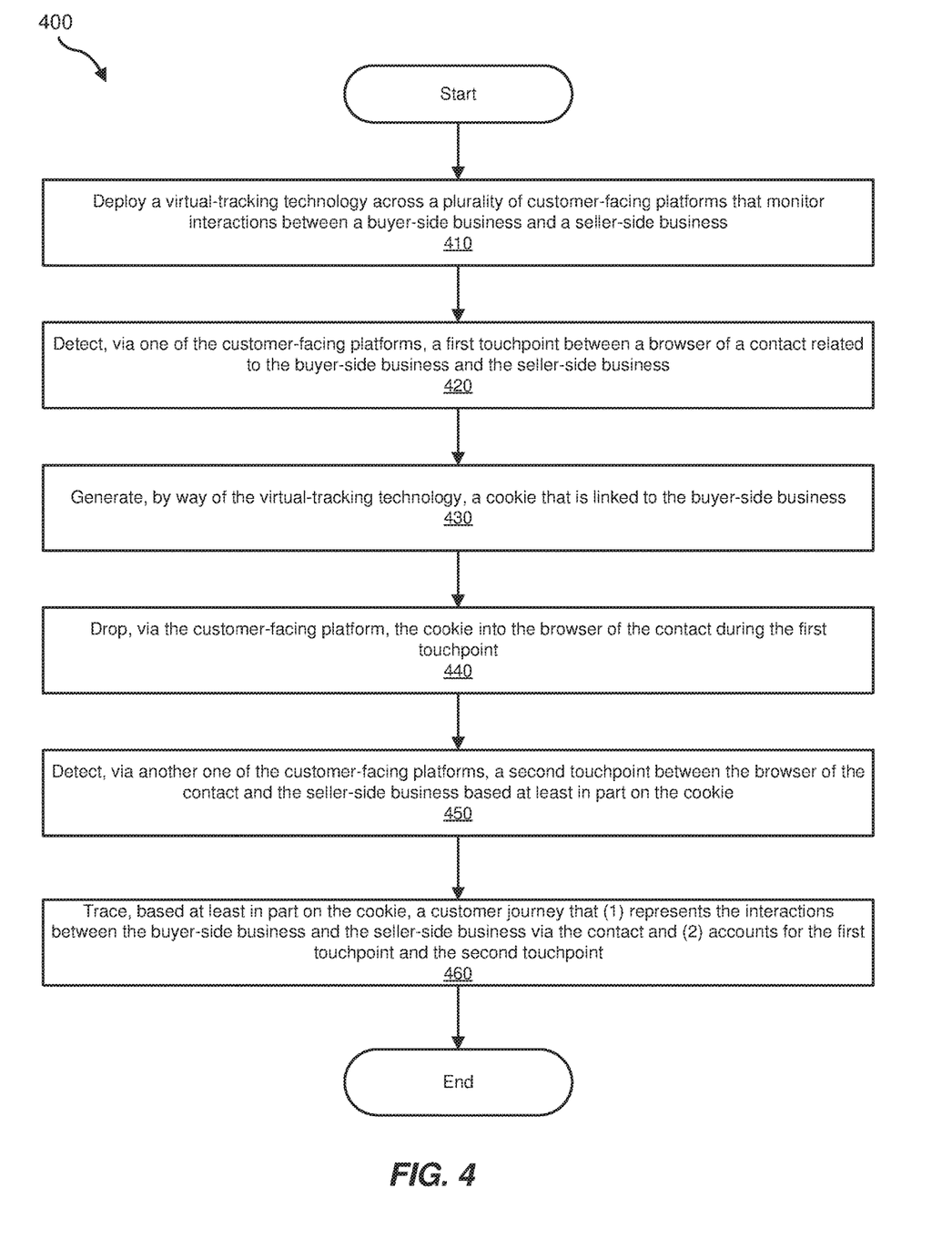
FIG. 4 is a flow diagram of an exemplary method for matching and delivering account-level data from multiple customer-facing platforms based on contact-level touchpoints.

FIG. 4 is a flow diagram of an exemplary computer-implemented method 400 for matching and delivering account-level data from multiple customer-facing platforms based on contact-level touchpoints. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 410 one or more of the systems described herein may deploy a virtual-tracking technology across a plurality of customer-facing platforms that monitor interactions between a buyer-side business and a seller-side business. For example, deployment module 104 may, as part of one or more of computing devices 206 and 208(1)-(N) in FIG. 2, deploy virtual-tracking technology 120 across customer-facing platforms 220(1)-(N). In this example, customer-facing platforms 220(1)-(N) may monitor interactions between buyer-side business 210 and seller-side business 212. Additionally or alternatively, customer-facing platforms 220(1)-(N) may collect information about such interactions.

The systems described herein may perform step 410 in a variety of different ways and/or contexts. In some examples, deployment module 104 may deploy virtual-tracking technology 120 across customer-facing platforms 220(1)-(N) from a centralized management environment of seller-side business 212. For example, deployment module 104 may, as part of computing device 206, deploy virtual-tracking technology 120 into each of computing devices 208(1)-(N). In this example, computing device 206 may represent and/or be included in a centralized management environment that is independent of customer-facing platforms 220(1)-(N).

In some examples, deployment module 104 may deploy virtual-tracking technology 120 across customer-facing platforms 220(1)-(N) by modifying customer-facing platforms 220(1)-(N). For example, deployment module 104 may add, introduce, and/or integrate some JAVASCRIPT code into each of customer-facing platforms 220(1)-(N). In this example, the JAVASCRIPT code may cause and/or direct customer-facing platforms 220(1)-(N) to generate cookies that are each linked to a specific buyer-side business and/or one of the contacts of that buyer-side business. In this example, the JAVASCRIPT code may also cause and/or direct customer-facing platforms 220(1)-(N) to drop such cookies into contacts' browsers during touchpoints that involve the contacts. In addition, the JAVASCRIPT code may also cause and/or direct customer-facing platforms 220(1)-(N) to report and/or log touchpoints between contacts and seller-side business 212.

Returning to FIG. 4, at step 420 one or more of the systems described herein may detect, via one of the customer-facing platforms, a first touchpoint between a browser of a contact related to the buyer-side business and the seller-side business. For example, detection module 106 may, as part of one or more of computing devices 206 and 208(1)-(N) in FIG. 2, detect a first touchpoint between browser 222 in FIG. 2 and seller-side business 212 via customer-facing platform 220(1). In this example, browser 222 may be running on computing device 202 operated by a contact of buyer-side business 210.

The systems described herein may perform step 420 in a variety of different ways and/or contexts. In some examples, detection module 106 may detect some form of contact and/or interaction between browser 222 and customer-facing platform 220(1). In one example, detection module 106 may discover, uncover, and/or identify evidence that the person operating browser 222 is a contact related to buyer-side business 210. In this example, detection module 106 may associate that contact with buyer-side business based at least in part on the evidence.

As a specific example, detection module 106 may identify the IP address of computing device 202 as browser 222 opens and/or visits customer-facing platform 220(1) in connection with seller-side business 212. In this example, detection module 106 may determine that the IP address of computing device 202 is linked to buyer-side business 210 by querying ADOBE's reverse IP lookup tool for the owner and/or user of that IP address. Upon determining that the IP address is assigned and/or linked to buyer-side business 210, detection module 106 may attribute and/or ascribe this touchpoint between browser 222 and seller-side business 212 as being initiated by and/or involving a contact of buyer-side business 210.

As another example, detection module 106 may determine that the contact operating browser 222 entered information that implicates buyer-side business 210 into customer-facing platform 220(1). For example, customer-facing platform 220(1) may provide an online form that is filled out by the contact operating browser 222. In this example, when filling out the online form, the contact may enter certain information indicating that the contact works for, represents, and/or is otherwise associated with buyer-side business 210. As a result, detection module 106 may attribute and/or ascribe this touchpoint between browser 222 and seller-side business 212 as being initiated by and/or involving a contact of buyer-side business 210.

As a further example, detection module 106 may determine that the contact logged into an account linked to buyer-side business 210 via customer-facing platform 220 (1). In one example, customer-facing platform 220(1) may provide a secure login that requires authentication credentials for account users and/or owners. In this example, the accounts may store and/or contain information about the account users and/or owners. For example, a user may create and/or log into an account via customer-facing platform 220(1). The user may then upload and/or enter certain information to his or her account via customer-facing platform 220(1). This information may indicate that the user works for, represents, and/or is otherwise associated with buyer-side business 210. As a result, detection module 106 may attribute and/or ascribe this touchpoint between browser 222 and seller-side business 212 as being initiated by and/or involving a contact of buyer-side business 210.

Returning to FIG. 4, at step 430 one or more of the systems described herein may generate, by way of the virtual-tracking technology, a cookie that is linked to the buyer-side business. For example, cookie module 108 may, as part of one or more of computing devices 206 and 208(1)-(N) in FIG. 2, generate cookie 122 that corresponds and/or is linked to buyer-side business 210. Additionally or alternatively cookie 122 may correspond and/or be linked to the contact operating computing device 202 and/or browser 222.

The systems described herein may perform step 430 in a variety of different ways and/or contexts. In some examples, cookie module 108 may create cookie 122 and then associate cookie 122 with buyer-side business 210, the contact, and/or browser 222. In such examples, cookie module 108 may record the association and/or relationship between cookie 122 and buyer-side business 210, the contact, and/or browser 222 at customer-facing platform 220(1) and/or across all of customer-facing platforms 220(1)-(N). Additionally or alternatively, cookie module 108 may record this association and/or relationship at the centralized management environment. For example, cookie module 108 may direct computing device 206 to record and/or store cookie 122 as part of information 226 in data lake 224.

In one example, cookie 122 may include and/or represent a token that contains a virtual ID. This virtual ID may correspond and/or be linked to buyer-side business 210, the contact, and/or browser 222. As a result, this virtual ID may be used to link and/or attribute the contact's subsequent web activities to buyer-side business 210.

Returning to FIG. 4, at step 440 one or more of the systems described herein may drop, via the customer-facing platform, the cookie into the browser of the contact during the first touchpoint. For example, cookie module 108 may, as part of one or more of computing devices 206 and 208(1)-(N) in FIG. 2, drop cookie 122 into browser 222 on computing device 202 during the first touchpoint. The phrase "to drop," as used in this context, generally refers the process of embedding and/or leaving the cookie in a browser running on a computing device.

The systems described herein may perform step 440 in a variety of different ways and/or contexts. In some examples, cookie module 108 may drop cookie 122 into browser 222 as browser 222 initiates contact and/or interaction with customer-facing platform 220(1). In other examples, cookie module 108 may drop cookie 122 into browser 222 after identifying the relationship between the contact operating browser 222 and buyer-side business 210.

Returning to FIG. 4, at step 450 one or more of the systems described herein may detect, via another one of the customer-facing platforms, a second touchpoint between the browser of the contact and the seller-side business based at least in part on the cookie. For example, detection module 106 may as part of one or more of computing devices 206 and 208(1)-(N) in FIG. 2, detect a second touchpoint between browser 222 and seller-side business 212 via customer-facing platform 220(N). In this example, detection module 106 may determine that the second touchpoint involves the same browser as the first touchpoint based at least in part on cookie 122.

The systems described herein may perform step 450 in a variety of different ways and/or contexts. In some examples, detection module 106 may detect some form of contact and/or interaction between browser 222 and customer-facing platform 220(N). In one example, detection module 106 may determine that browser 222 includes and/or contains cookie 122. For example, detection module 106 may detect the presence of cookie 122 at browser 222. In this example, detection module 106 may then confirm that cookie 122 corresponds and/or is linked to buyer-side business 210 and/or the contact.

Returning to FIG. 4, at step 460 one or more of the systems described herein may trace, based at least in part on the cookie, a customer journey that (1) represents the interactions between the buyer-side business and the seller-side business via the contact and (2) accounts for the first touchpoint and the second touchpoint. For example, tracing module 110 may, as part of one or e of computing devices 206 and 208(1)-(N) in FIG. 2, trace a customer journey of buyer-side business 210 based at least in part on cookie 122. In this example, the customer journey may represent and/or account for the interactions (e.g., the first and second touchpoints) between the contact and seller-side business 212 via customer-facing platforms 220(1)-(N). Since the contact is related to buyer-side business 210 in one way or another, the contact's interactions with seller-side business 212 via customer-facing platforms 220(1)-(N) may be attributed and/or ascribed to buyer-side business 210.

The systems described herein may perform step 450 in a variety of different ways and/or contexts. In some examples, tracing module 110 may identify, collect, and/or gather any touchpoints involving the contact and seller-side business 212. For example, tracing module 110 may identify all the touchpoints involving the contact based at least in part on cookie 122. In other words, in the event that cookie 122 was detected during a touchpoint, detection module 106 may attribute and/or ascribe that touchpoint to the contact and/or buyer-side business 210. Subsequently, tracing module 110 may trace the customer journey of buyer-side business 210 by piecing together and/or gathering all the touchpoints in which cookie 122 was detected.

In some examples, ingestion module 116 may collect and/or ingest data and/or information about the interactions between buyer-side business 210 and seller-side business 212 from customer-facing platforms 220(1)-(N). Such interactions may include any touchpoints in which cookie 122 was detected. In one example, ingestion module 116 may collect and/or ingest various types of data and/or information about such interactions.

Figure 5:
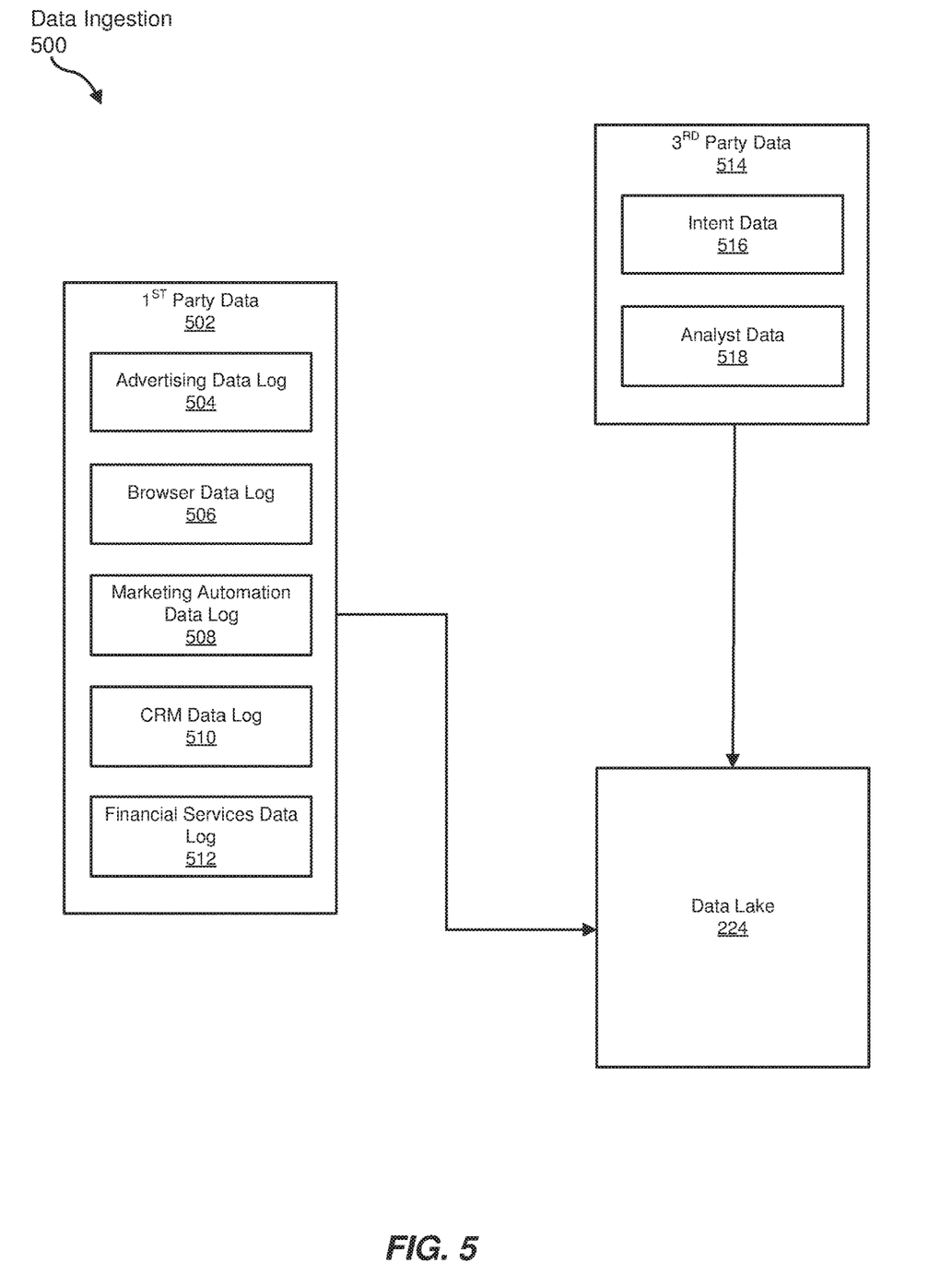
FIG. 5 is a block diagram of an exemplary data ingestion process in which data from various sources are ingested into a data lake.

FIG. 5 is a block diagram of exemplary data ingestion 500 in which different types of data are ingested into data lake 224 from various sources. As illustrated in this figure, data ingestion 500 may involve the ingestion of $1^{st}$ party data 502 and $3^{rd}$ party data 514 by data lake 224. The term "$1^{st}$ party data," as used herein, generally refers to any data that is generated and/or owned by the seller-side business at issue. In contrast, the term "$3^{rd}$ party data," as used herein, generally refers to any data generated outside of the seller-side business at issue and/or to which the seller-side business at issue has obtained the rights and/or permission to access and/or use.

As illustrated in FIG. 5, $1^{st}$ party data 502 may include and/or represent advertising data log 504, browser data log 506, marketing data log 508, CRM data log 510, and/or financial services data log 512. In this example, $3^{rd}$ party data 514 may include and/or represent intent data 516 and/or analyst data 518. Both $1^{st}$ party data 502 and $3^{rd}$ party data 514 may include, involve, and/or account for the various touchpoints between buyer-side business 210 and seller-side business 212. Additionally or alternatively, $1^{st}$ party data 502 and/or $3^{rd}$ party data 514 may have originated from and/or been collected through customer-facing platforms 220(1)-(N).

In one example, ingestion module 116 may collect and/or gather $1^{st}$ party data 502 and/or $3^{rd}$ party data 514. In this example, ingestion module 116 may then populate data lake 224 with $1^{st}$ party data 502 and/or $3^{rd}$ party data 514. As a result, data lake 224 may include various levels of data and/or records involving buyer-side business 210 (such as contact-level data and/or account-level data).

In some examples, ingestion module 116 may map together information that is about the interactions between buyer-side business 210 and seller-side business 212 and was collected from multiple customer-facing platforms. For example, ingestion module 116 may identify information collected via customer-facing platform 220(1) about a touchpoint where cookie 122 was detected. In this example, ingestion module 116 may also identify information collected via customer-facing platform 220(N) about another touchpoint where cookie 122 was detected. Ingestion module 116 may then associate these touchpoints with one another based at least in part on them being about the interactions between buyer-side business 210 and seller-side business 212. Accordingly, ingestion module 116 may be able convert a contact into an account during the customer's purchasing journey.

Various algorithms may be employed on and/or applied to data lake 224 to extract and/or transform meaningful information about the interactions between buyer-side business 210 and seller-side business 212. For example, ingestion module 116 may match accounts and/or records across the customer journey. In one example, ingestion module 116 may apply a string-index algorithm to at least a portion of data lake 224 to match accounts and/or records based at least in part on a common contact. Additionally or alternatively, ingestion module 116 may apply a string-edit-distance algorithm to at least a portion of data lake 224 to match accounts and/or records based at least in part on a common contact. In either case, the applied algorithm may be self-learning and/or incorporate or perform machine-learning.

In one example, ingestion module 116 may apply a string-index algorithm that indexes strings as n-grams (e.g., 2-grams or 3-grams) weighted by position in a sparse vector space. Ingestion module 116 may then apply an exact-neighbor algorithm to find n-closest matching records for a particular record. Ingestion module 116 may also report the distances of those n-closet matching records. Finally, ingestion module 116 may apply a machine-learning model (such as a random forest classifier) to identify the correct matches and then calculate their probability of correctness.

In some examples, report module 112 may generate a marketing insight report that describes the customer journey of buyer-side business 210 with respect to seller-side business 212. Report module 112 may incorporate the information about the interactions between buyer-side business 210 and seller-side business 212 into the marketing insight report. In these examples, report module 112 may deliver the marketing insight report to seller-side business 212 for consumption and/or presentation. For example presentation module 114 may, as part of a computing device owned and/or operated by seller-side business 212, provide the marketing insight report for presentation to one or more employees and/or representatives of seller-side business 212.

In some examples, report module 112 may calculate and/or generate a customer engagement score that represents an estimation of the buyer-side business's level of interest in purchasing a product from the seller-side business. Additionally or alternatively, the customer engagement score may represent the correlation between pre-sales activities and certain financial outcomes (such as revenue and/or profit changes). Report module 112 may apply and/or employ a variety of different formulas to data lake 224 to calculate and/or generate the customer engagement score. Report module 112 may weight and/or scale the customer engagement score and/or some components included in the formula for calculating the customer engagement score to ensure that the same remains within a certain range.

The customer engagement score may correspond to the buyer-side business's level of engagement over a certain period of time. In one example, the customer engagement score may represent the buyer-side business's level of engagement over the last month. In another example the customer engagement score may represent an average of the buyer-side business's level of engagement over the last 3 months.

As a specific example report module 112 may calculate and/or generate the customer engagement score by applying a specific formula: Customer Engagement Score=(# of Seller's Events Attended)*3+(# of Seller's Webinars Attended)*2+(# of Email Click-Throughs)*0.1+(# of Responses)*3+(# of Marketing Qualified Leads)*3+arg max (log(# of ADOBE Actions))*2, 0)+arg max (log(# of ADOBE Page Views)*2+1)+log((# of ADOBE Forum Page Views/2+1)+log((# of ADOBE Other Page Views/10+1, 0).

Figure 6:
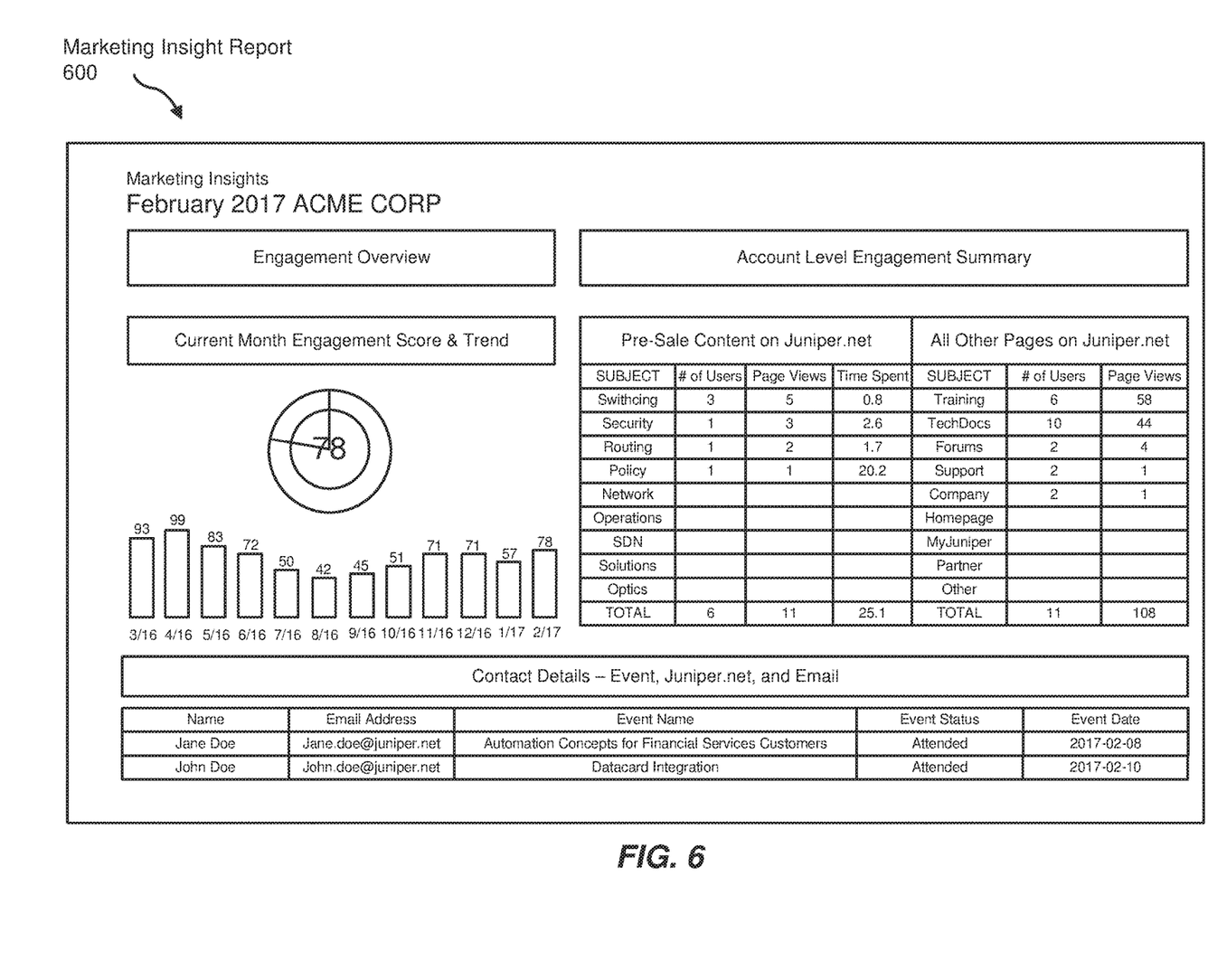
FIG. 6 is an illustration of an exemplary marketing insight report that includes account-level data collected via multiple customer-facing platforms.

FIG. 6 is an illustration of an exemplary marketing insight report 600 that includes account-level data collected via multiple customer-facing platforms. In some examples, marketing insight report 600 may include an engagement score section that indicates whether the buyer-side business's interest has surged or plummeted. In one example, marketing insight report 600 may include an account-level engagement section that identifies certain products and/or services being researched by the buyer-side business. Additionally or alternatively, marketing insight report 600 may include a contact-level engagement section that identifies certain email addresses that are associated with the buyer-side business and engaging with the seller-side business in one way or another. Marketing insight report 600 may help and/enable the B2B salespeople at the seller-side business to increase sales and/or close certain deals.

Figure 7:
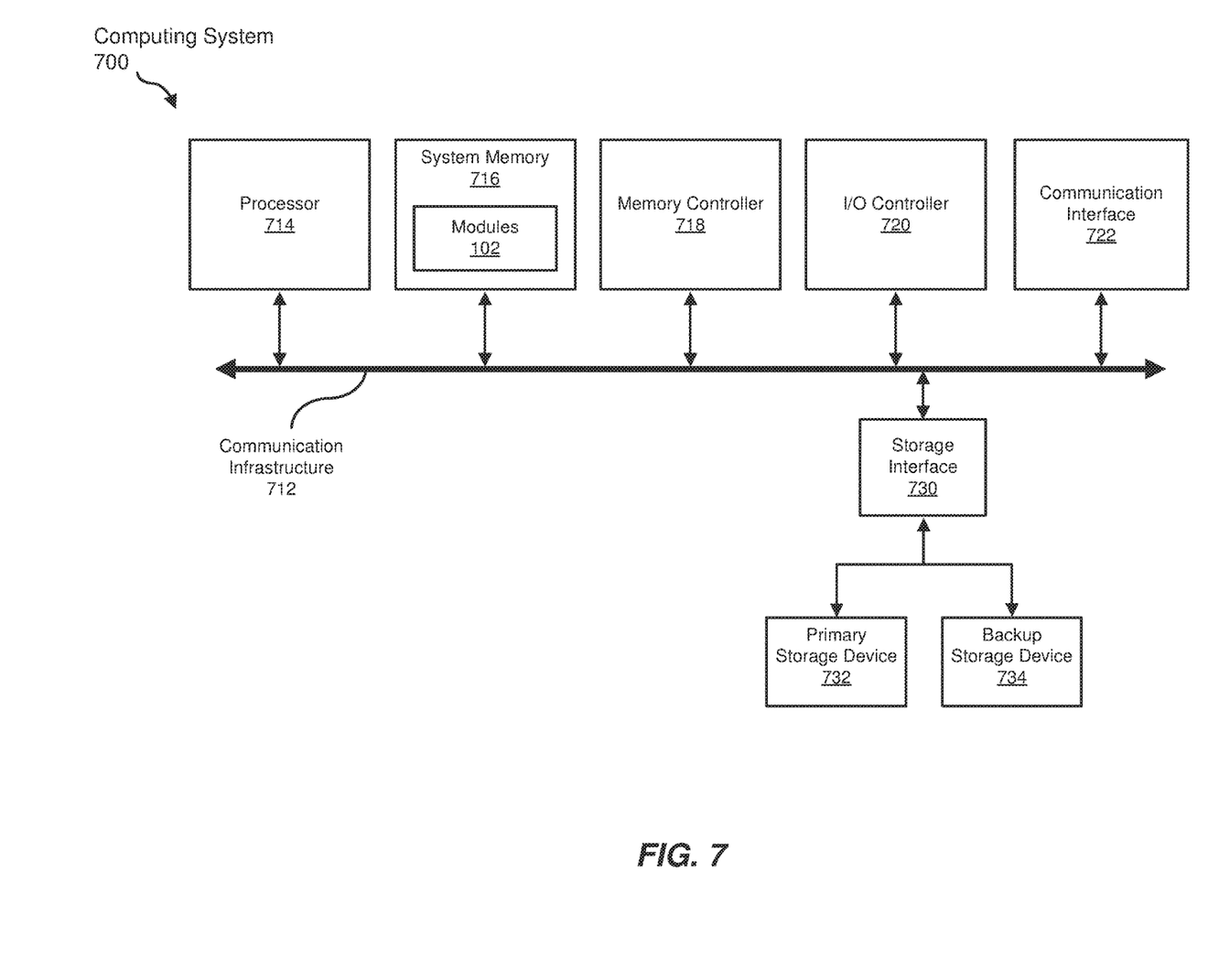
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 4. All or a portion of computing system 700 may also perform and/or be a means for performing and/or implementing any other steps, methods, or processes described and/or illustrated herein. In one example, computing system 700 may include system 100 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol a network layer protocol, a transport layer protocol a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include without limitation, Small Computer System Interface (SCSI) host adapters, Universal Serial Bus (USB) host adapters, IEEE 1394 host adapters, Advanced Technology Attachment (ATA), Parallel ATA (DATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
deploying a virtual-tracking technology across a plurality of customer-facing platforms that monitor interactions between a buyer-side business and a seller-side business, wherein the plurality of customer-facing platforms does not include any email platforms;
detecting, via one of the customer-facing platforms, a first touchpoint between the seller-side business and a browser running on a computing device operated by a contact related to the buyer-side business;
discovering evidence that the contact is related to the buyer-side business by identifying information entered by the contact into the one of the customer-facing platforms, the information implicating the buyer-side business;
associating the contact with the buyer-side business based at least in part on the information entered by the contact into the one of the customer-facing platforms;
generating, by way of the virtual-tracking technology, a cookie that is linked to the buyer-side business, wherein the cookie includes a virtual identifier that corresponds to the buyer-side business;
dropping, via the customer-facing platform, the cookie into the browser running on the computing device operated by the contact during the first touchpoint;
detecting, via another one of the customer-facing platforms, a second touchpoint between the seller-side business and an additional browser running on an additional computing device operated by an additional contact related to the buyer-side business;
dropping, via the another one of the customer-facing platforms, the cookie into the additional browser running on the additional computing device operated by the additional contact during the second touchpoint;
detecting, based at least in part on the virtual ID included in the cookie, a third touchpoint between the seller-side business and the browser or the additional browser; and
tracing, based at least in part on the cookie, a customer journey that:
represents the interactions between the buyer-side business and the seller-side business via the contact and the additional contact; and
accounts for the first touchpoint, the second touchpoint, and the third touchpoint.

2. The method of claim 1, further comprising:
generating a marketing insight report that describes the customer journey of the buyer-side business with respect to the seller-side business; and
delivering the marketing insight report to the seller-side business for consumption.

3. The method of claim 2, wherein delivering the marketing insight report to the seller-side business comprises providing the marketing insight report for presentation on at least one computing device of the seller-side business.

4. The method of claim 2, further comprising:
collecting, via the plurality of customer-facing platforms, information about the interactions between the buyer-side business and the seller-side business; and
populating a data lake with the information about the interactions between the buyer-side business and the seller-side business.

5. The method of claim 4, wherein generating the marketing insight report comprises incorporating the information about the interactions between the buyer-side business and the seller-side business into the marketing insight report.

6. The method of claim 4, wherein populating the data lake with the information about the interactions between the buyer-side business and the seller-side business comprises:
identifying information that:
is about the interactions between the buyer-side business and the seller-side business; and
originated from the one of the customer-facing platforms;
identifying additional information that:
is about the interactions between the buyer-side business and the seller-side business; and
originated from the another one of the customer-facing platforms; and
mapping the information to the additional information based at least in part on the information and the additional information both being about the interactions between the buyer-side business and the seller-side business.

7. The method of claim 4, wherein the information collected via the plurality of customer-facing platforms comprises at least:
a first data set related to the first touchpoint between the seller-side business and the browser running on the computing device operated by the contact; and
a second data set related to the second touchpoint between the seller-side business and the additional browser running on the additional computing device operated by the additional contact.

8. The method of claim 2, wherein generating the marketing insight report comprises:
calculating a customer engagement score that represents an estimation of the buyer-side business's level of interest in purchasing a product from the seller-side business; and
incorporating the customer engagement score into the marketing insight report.

9. The method of claim 8, wherein the customer engagement score comprises an average of a current customer engagement score and at least one previous customer engagement score, wherein the average represents the estimation of the buyer-side business's level of interest in purchasing the product from the seller-side business over a certain period of time.

10. The method of claim 1, wherein deploying the virtual-tracking technology across the plurality of customer-facing platforms comprises integrating, into the plurality of customer-facing platforms, at least one script that directs the customer-facing platforms to:
drop cookies that are linked to buyer-side businesses into browsers of contacts related to the buyer-side businesses; and
report touchpoints between the browsers of the contacts and the seller-side business.

11. The method of claim 1, wherein the evidence that the contact is related to the buyer-side business further comprises at least one of:
   the computing device operated by the contact has an IP address that is linked to the buyer-side business; and
   the contact logged into an account linked to the buyer-side business via the customer-facing platform.

12. The method of claim 1, wherein deploying the virtual-tracking technology across the plurality of customer-facing platforms comprises deploying the virtual-tracking technology from a centralized management environment that is independent of the plurality of customer-facing platforms.

13. The method of claim 1, wherein tracing the customer journey comprises compiling information about the interactions between the buyer-side business and the seller-side business by:
   identifying touchpoints that were detected via the plurality of customer-facing platforms; and
   determining, based at least in part on the cookie, that the touchpoints were initiated by the contact across the plurality of customer-facing platforms.

14. The method of claim 1, wherein the plurality of customer-facing platforms comprise at least one of:
   a web-based advertising platform;
   a website analytics platform;
   an online form;
   a reverse IP lookup tool;
   a marketing automation platform;
   a Customer Relationship Management (CRM) platform;
   a financial management platform;
   an intent-data aggregator; and
   an analyst-driven data aggregator.

15. A system comprising:
   a deployment module, stored in memory, that deploys a virtual-tracking technology across a plurality of customer-facing platforms that monitor interactions between a buyer-side business and a seller-side business, wherein the plurality of customer-facing platforms does not include any email platforms;
   a detection module, stored in memory, that detects, via one of the customer-facing platforms, a first touchpoint between the seller-side business and a browser running on a computing device operated by a contact related to the buyer-side business, wherein detecting the first touchpoint comprises:
      discovering evidence that the contact is related to the buyer-side business by identifying information entered by the contact into the one of the customer-facing platforms, the information implicating the buyer-side business;
      associating the contact with the buyer-side business based at least in part on the information entered by the contact into the one of the customer-facing platforms;
   a cookie module, stored in memory, that:
      generates, by way of the virtual-tracking technology, a cookie that is linked to the buyer-side business, wherein the cookie includes a virtual identifier that corresponds to the buyer-side business; and
      drops, via the customer-facing platform, the cookie into the browser running on the computing device operated by the contact during the first touchpoint;
   wherein:
      the detection module detects, via another one of the customer-facing platforms, a second touchpoint between the seller-side business and an additional browser running on an additional computing device operated by an additional contact related to the buyer-side business;
      the cookie module drops, via the another one of the customer-facing platforms, the cookie into the additional browser running on the additional computing device operated by the additional contact during the second touchpoint; and
      the detection module detects, based at least in part on the virtual identifier included in the cookie, a third touchpoint between the seller-side business and the browser or the additional browser; and
   a tracing module, stored in memory, that traces, based at least in part on the cookie, a customer journey that:
      represents the interactions between the buyer-side business and the seller-side business via the contact and the additional contact; and
      accounts for the first touchpoint, the second touchpoint, and the third touchpoint; and
   at least one physical processor configured to execute the deployment module, the detection module, the cookie module, and the tracing module.

16. The system of claim 15, further comprising a report module, stored in memory, that:
   generates a marketing insight report that describes the customer journey of the buyer-side business with respect to the seller-side business; and
   delivers the marketing insight report to the seller-side business for consumption.

17. The system of claim 16, further comprising a presentation module,
   stored in memory, that provides the marketing insight report for presentation on at least one computing device of the seller-side business.

18. The system of claim 16, further comprising an ingestion module, stored in memory, that:
   collects, via the plurality of customer-facing platforms, information about the interactions between the buyer-side business and the seller-side business; and
   populates a data lake with the information about the interactions between the buyer-side business and the seller-side business.

19. A non-transitory computer-readable medium comprising one or more computer-executable instructions that, when executed by at least one processor of a computing system, cause the computing system to:
   deploy a virtual-tracking technology across a plurality of customer-facing platforms that monitor interactions between a buyer-side business and a seller-side business, wherein the plurality of customer-facing platforms does not include any email platforms;
   detect, via one of the customer-facing platforms, a first touchpoint between the seller-side business and a browser running on a computing device operated by a contact related to the buyer-side business, wherein detecting the first touchpoint comprises:
      discovering evidence that the contact is related to the buyer-side business by identifying information entered by the contact into the one of the customer-facing platforms, the information implicating the buyer-side business;
      associating the contact with the buyer-side business based at least in part on the information entered by the contact into the one of the customer-facing platforms;

generate, by way of the virtual-tracking technology, a cookie that is linked to the buyer-side business, wherein the cookie includes a virtual identifier that corresponds to the buyer-side business;
drop, via the customer-facing platform, the cookie into the browser running on the computing device operated by the contact during the first touchpoint;
detect, via another one of the customer-facing platforms, a second touchpoint between the seller-side business and an additional browser running on an additional computing device operated by an additional contact related to the buyer-side business;
drop, via the another one of the customer-facing platforms, the cookie into the additional browser running on the additional computing device operated by the additional contact during the second touchpoint;
detect, based at least in part on the virtual identifier included in the cookie, a third touchpoint between the seller-side business and the browser or the additional browser; and
trace, based at least in part on the cookie, a customer journey that:
  represents the interactions between the buyer-side business and the seller-side business via the contact and the additional contact; and
  accounts for the first touchpoint, the second touchpoint, and the third touchpoint.

* * * * *